US006447048B2

(12) United States Patent
Crean

(10) Patent No.: US 6,447,048 B2
(45) Date of Patent: *Sep. 10, 2002

(54) TRAVEL TRAILER WITH EXTENDABLE TWO LEVEL BATHROOM AND BEDROOM

(75) Inventor: Johnnie Robert Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/757,753

(22) Filed: Jan. 9, 2001

Related U.S. Application Data

(63) Continuation of application No. 09/283,708, filed on Apr. 1, 1999, now Pat. No. 6,170,903.

(51) Int. Cl.$^7$ ................................................. B62C 1/06
(52) U.S. Cl. ................. 296/168; 296/26.13; 296/26.12; 296/171; 52/67
(58) Field of Search ........................... 296/26.12, 26.13, 296/171, 172, 173, 175, 176, 165, 25, 24.1, 168, 181; 52/67

(56) References Cited

U.S. PATENT DOCUMENTS

| | | | |
|---|---|---|---|
| 1,536,518 A | | 5/1925 | Osborn |
| 2,150,615 A | * | 3/1939 | Sword ...................... 296/26.13 |
| 2,177,394 A | * | 10/1939 | Pierce ...................... 296/26.13 |
| 2,225,319 A | * | 12/1940 | Rollo ....................... 296/26.13 |
| 2,606,057 A | * | 8/1952 | Johnson .................... 296/26.13 |
| 2,639,187 A | | 5/1953 | Grumbache |

(List continued on next page.)

FOREIGN PATENT DOCUMENTS

| | | |
|---|---|---|
| CH | 353262 | 9/1957 |
| DE | 42 04 640 A | 8/1993 |
| GB | 616274 | 1/1949 |
| GB | 2088789 | 11/1980 |
| GB | 2 260 951 | 5/1993 |
| IT | 478931 | 5/1951 |

OTHER PUBLICATIONS

Carefre, the World's Greatest Selection of RV Awnings, Sidewinder II, vol. 8, Issue 1, p. 19, 1997.
Brochure: Ideal from Alfa, 11/96.

*Primary Examiner*—Joseph D. Pape
*Assistant Examiner*—Lori L Coletta
(74) *Attorney, Agent, or Firm*—Knobbe, Martens, Olson & Bear, LLP

(57) ABSTRACT

A recreational travel trailer comprising a main housing which encloses a living space having multiple floor levels, and a two level extendable housing having a deployed configuration and an extended configuration. The extendable housing is movably positioned within an opening in the main housing so that a first floor of the extendable housing is positioned adjacent to a first floor of the main housing and so that a second floor of the extendable housing is positioned adjacent to a second floor of the main housing. In the deployed configuration, the extendable housing extends through the opening of the main housing so as to increase the enclosed space within the trailer. In the retracted configuration, the extendable housing is substantially positioned within the main housing so as to provide the main housing with a shape and size that is suitable for being towed on a public road. The trailer is further comprised of a two level actuator assembly which moves the two level extendable housing. The actuator assembly is comprised of a rear and front rail assemblies that are vertically offset from each other and a two level drive mechanism positioned therebetween that causes the rail assemblies to move opposite ends of the extendable housing in a synchronous manner. A foldable wardrobe having a deployed configuration and a retracted configuration is mounted to the extendable housing. In the deployed configuration, the wardrobe extends into a full size wardrobe. In the retracted configuration, the width of the wardrobe is reduced so as to enable the extendable housing to be placed into the retracted configuration.

39 Claims, 7 Drawing Sheets

U.S. PATENT DOCUMENTS

| | | | |
|---|---|---|---|
| 2,704,223 A | * 3/1955 | Houdart | 296/26.13 |
| 2,788,791 A | 4/1957 | Pospisil et al. | |
| 2,876,035 A | * 3/1959 | Houdart | 296/26.12 |
| 3,106,750 A | * 10/1963 | Jarman | 296/26.13 |
| 3,165,350 A | 1/1965 | Willson | |
| 3,254,914 A | 6/1966 | Steck | |
| 3,287,058 A | 11/1966 | Wells | |
| 3,300,839 A | 1/1967 | Lichti | |
| 3,341,986 A | * 9/1967 | Brosig | 296/26.13 |
| 3,565,480 A | 2/1971 | McCollum et al. | |
| 3,572,809 A | * 3/1971 | Buland | 296/26.13 |
| 3,608,954 A | * 9/1971 | Lynd | 296/26 X |
| 3,719,386 A | * 3/1973 | Puckett et al. | 296/26.13 |
| 3,735,998 A | 5/1973 | Green | 280/106 T |
| 3,740,088 A | * 6/1973 | Ratcliff | 296/26 X |
| 3,801,138 A | 4/1974 | Quick | 280/478 R |
| 3,825,281 A | 7/1974 | Howard | 280/423 R |
| 3,850,470 A | * 11/1974 | Trelle | 296/156 |
| 3,887,220 A | 6/1975 | Hall | 280/423 R |
| 3,895,726 A | 7/1975 | Rassieur | 214/83.24 |
| 3,902,752 A | 9/1975 | Pelletier | 296/91 |
| 3,915,492 A | 10/1975 | Agnese | 296/23 C |
| 3,918,510 A | 11/1975 | Hayward | 160/45 |
| 3,959,985 A | 6/1976 | Schulze, Sr. | 62/239 |
| 4,014,586 A | 3/1977 | Swofford | 296/23 A |
| 4,106,732 A | 8/1978 | Whiting | 296/23 C |
| 4,108,326 A | 8/1978 | Bertolini | 220/1.5 |
| 4,109,954 A | 8/1978 | Wall | 296/23 A |
| 4,147,379 A | 4/1979 | Winslow | 280/781 |
| 4,175,576 A | 11/1979 | Iby | 135/1 A |
| 4,322,108 A | 3/1982 | McPherson | 296/164 |
| 4,457,554 A | 7/1984 | Fuisz et al. | 296/179 |
| 4,468,823 A | 9/1984 | Toujian | 5/417 |
| 4,480,866 A | * 11/1984 | Komatsu | 296/26 X |
| 4,500,132 A | * 2/1985 | Yoder | 296/171 |
| 4,550,946 A | * 11/1985 | Hanemaayer | 296/175 |
| 4,589,463 A | 5/1986 | Ryan | 160/88 |
| RE32,262 E | * 10/1986 | Stewart | 296/26 X |
| 4,652,041 A | 3/1987 | Barber et al. | 296/171 |
| 4,653,125 A | 3/1987 | Porter | 4/301 |
| 4,719,954 A | 1/1988 | Curtis et al. | 160/67 |
| 4,728,144 A | 3/1988 | Crean | 296/168 |
| 4,729,594 A | 3/1988 | Hoff | 296/161 |
| 4,746,164 A | 5/1988 | Crean | 296/164 |
| 4,772,063 A | 9/1988 | Amy | 296/37.1 |
| 4,776,631 A | 10/1988 | Sargent et al. | 296/156 |
| 4,841,897 A | 6/1989 | Claflin | 114/120 |
| 4,867,502 A | 9/1989 | Sylvester et al. | 296/161 |
| 4,955,661 A | * 9/1990 | Mattice | 296/26 X |
| 4,957,323 A | 9/1990 | Johnson | 296/181 |
| 4,971,355 A | 11/1990 | Studdard | 280/789 |
| 4,974,889 A | 12/1990 | Sargent | 296/156 |
| 5,028,072 A | 7/1991 | Lindsay | 280/789 |
| 5,061,001 A | * 10/1991 | Madden et al. | 296/26 |
| 5,090,749 A | * 2/1992 | Lee | 296/26 X |
| 5,100,196 A | 3/1992 | Dodgen | 296/156 |
| 5,100,716 A | 3/1992 | Juneau | 428/167 |
| 5,112,082 A | 5/1992 | Clelland | 280/783 |
| 5,143,418 A | 9/1992 | Fouquet | 296/182 |
| 5,171,056 A | * 12/1992 | Faludy et al. | 296/26 X |
| 5,199,120 A | 4/1993 | Holmes | 5/419 |
| 5,237,782 A | * 8/1993 | Cooper | 52/67 |
| 5,242,185 A | 9/1993 | Carr et al. | 280/423.1 |
| 5,248,005 A | 9/1993 | Mochizuki | 175/85 |
| 5,280,990 A | 1/1994 | Rinard | 296/180.1 |
| 5,291,701 A | * 3/1994 | Delacollette et al. | 52/67 |
| 5,358,298 A | 10/1994 | Fate | 296/26 |
| 5,374,094 A | * 12/1994 | Smith et al. | 296/26 |
| 5,401,050 A | 3/1995 | Baker | 280/656 |
| 5,403,063 A | 4/1995 | Sjostedt et al. | 296/187 |
| 5,419,607 A | 5/1995 | Oliveira | 296/159 |
| 5,516,182 A | 5/1996 | Aragon et al. | 296/100 |
| 5,529,825 A | 6/1996 | Sutherland | 428/88 |
| 5,560,444 A | 10/1996 | Tiedge | 180/209 |
| 5,566,918 A | 10/1996 | Becker | 248/351 |
| 5,620,224 A | 4/1997 | DiBiagio et al. | 296/26 |
| 5,634,683 A | * 6/1997 | Young | 52/67 X |
| 5,658,031 A | * 8/1997 | Dibiagio et al. | 296/26 |
| 5,658,032 A | * 8/1997 | Gardner | 296/26 |
| 5,673,962 A | * 10/1997 | Maieli et al. | 296/26 X |
| 5,706,616 A | * 1/1998 | Fernandez | 296/26 X |
| 5,718,253 A | 2/1998 | McNamee | 135/88.13 |
| 5,734,336 A | 3/1998 | Smithline | 340/903 |
| 5,746,473 A | * 5/1998 | Crean | 296/181 |
| 5,785,373 A | 7/1998 | Futrell et al. | 296/26.01 |
| 5,788,306 A | 8/1998 | DiBiagio et al. | 296/26.02 |
| 5,791,715 A | 8/1998 | Nebel | 296/26 |
| 5,791,726 A | 8/1998 | Kaufman | 296/181 |
| 5,800,002 A | 9/1998 | Tiedge et al. | 296/26 |
| 5,833,294 A | 11/1998 | Williams et al. | 296/24.1 |
| 5,894,698 A | 4/1999 | Dewald, Jr. et al. | 52/67 |
| 5,902,001 A | 5/1999 | Schneider | 296/26.13 |
| 5,915,774 A | 6/1999 | Tiedge | 296/26.13 |
| 5,934,026 A | 8/1999 | Green | 52/143 |
| 5,940,012 A | 8/1999 | Studebaker | 340/932.2 |
| 5,951,082 A | 9/1999 | DiBiagio et al. | 296/26.13 |
| 5,983,576 A | 11/1999 | Hanser et al. | 52/67 |
| 6,007,142 A | 12/1999 | Gehman et al. | 296/171 |
| 6,098,346 A | 8/2000 | Miller et al. | 52/67 |
| 6,158,794 A | 12/2000 | Flanagan | 296/37.6 |
| 6,170,903 B1 | * 1/2001 | Crean | 296/168 |
| 6,231,115 B1 | 5/2001 | Crean | 296/182 |
| 6,260,909 B1 | 7/2001 | Crean et al. | 296/163 |
| RE37,351 E | 9/2001 | Crean | 296/181 |
| 6,293,612 B1 | 9/2001 | Crean | 296/175 |

* cited by examiner

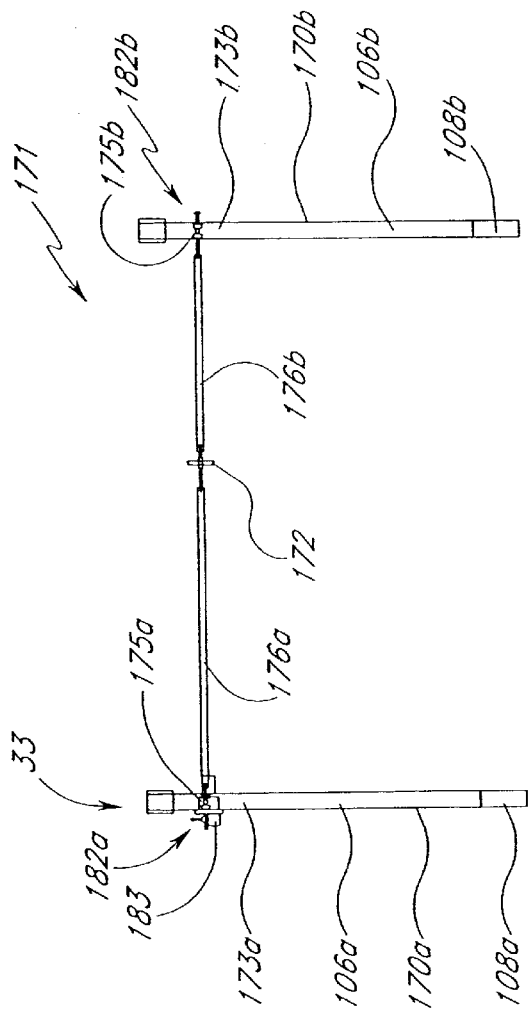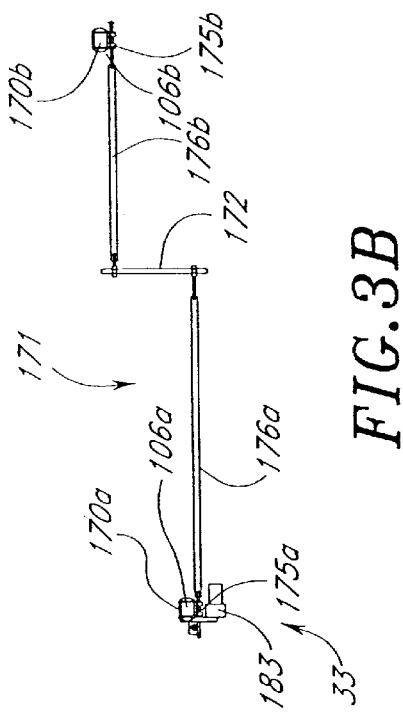
FIG.3A
FIG.3B

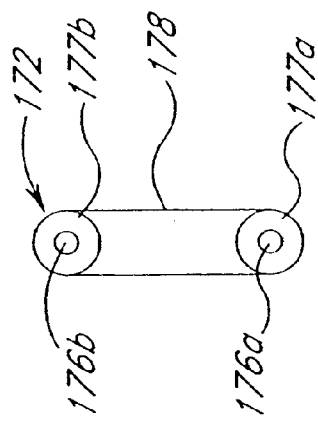
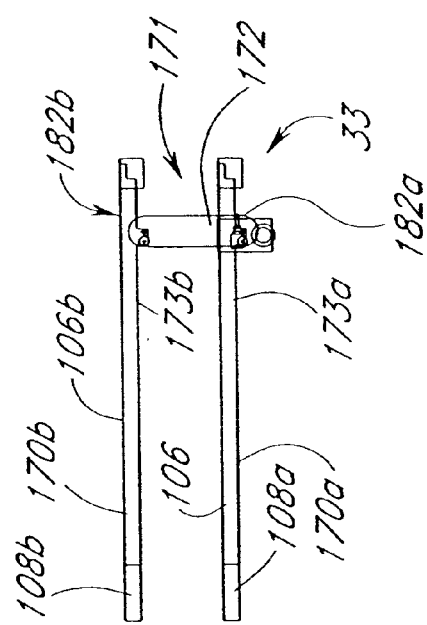
FIG.3D
FIG.3C

TRAVEL TRAILER WITH EXTENDABLE TWO LEVEL BATHROOM AND BEDROOM

RELATED APPLICATIONS

This application is a continuation of U.S. application Ser. No. 09/283,708 filed Apr. 1, 1999 now U.S. Pat. No. 6,170,903, entitled "Travel Trailer with Extendable Two Level Bathroom and Bedroom."

BACKGROUND OF THE INVENTION

1. Field of the Invention

The present invention relates to travel trailers and in particular relates to travel trailers that are adapted to expand in size so as to increase the effective interior area of the travel trailer.

2. Description of the Related Art

Recreational travel trailers are becoming increasingly popular with people who wish to retain the comforts and conveniences of home while spending extended periods of time away at remote locations. In particular, a recreational travel trailer is a modestly priced mobile structure which can be towed behind a passenger vehicle, such as a truck, and forms an enclosed interior living space so as to provide a shelter for individuals. In more elaborate configurations, the travel trailer typically includes amenities such as a bedroom, a bathroom with a sink and a flushing toilet, a kitchen with a refrigerator, stove, and sink, and a generously sized living area with reclining chairs and an entertainment center. Furthermore, a travel trailer can be easily parked at a wide variety of locations so that users can enjoy the amenities of the travel trailer at their favorite destination. Consequently, people who use travel trailers can usually be assured of a comfortable living environment at their preferred destination without having to rely on the availability of suitable hotels.

In response to consumer demand, manufactures of travel trailers have developed increasingly larger travel trailers. However, state and federal laws limit the dimensions of travel trailers that can be transported on public roads, thereby limiting the living space within the travel trailer. In particular, current regulations specify a maximum length, otherwise known as the maximum allowed length, of highway bound travel trailers to be no greater than 40 feet. Furthermore, current regulations specify a maximum width, otherwise known as the maximum allowed width, of highway bound travel trailers to be no greater than 8.5 feet. Thus, the travel trailer industry has devoted considerable resources to develop improved travel trailers so as to increase the living space of the travel trailer in a manner that is consistent with the forgoing size restrictions.

Consequently, manufacturers have developed travel trailers with one or more extendable members that provide the user with a supplemental living space when the travel trailer is parked. In particular, the extendable member is adapted to extend into a deployed configuration during the time that the travel trailer is parked so that the living space within the travel trailer is increased by an amount which is substantially equal to the supplemental living space of the extendable member. Furthermore, the extendable member is adapted to retract into a retracted configuration during the time that the travel trailer is being towed so that the traveling dimensions of the travel trailer are within the maximum allowed width and length.

The typical extendable member is positioned within an opening of the housing of the travel trailer and is comprised of a plurality of walls that form the supplemental living space therein and an opening that provides access to the supplemental living space. In particular, the walls of the typical extendable member are comprised of a lower horizontal wall that forms a single level planer floor which substantially aligns with an adjacent floor of the travel trailer and an upper horizontal wall that forms a single level planer ceiling which substantially aligns with an adjacent ceiling of the travel trailer. Furthermore, the extendable member is comprised of an outer vertical wall that is adapted to align with an outer wall of the travel trailer while the extendable member is placed in the retracted configuration, and a pair of horizontal side walls that join the upper and lower horizontal walls and the outer vertical wall together.

According to state of the prior art, the known extendable member is typically mounted on a pair of movable support rail assemblies which are positioned at a common elevation so as to provide movement of the extendable member with respect to the travel trailer. In particular, each support rail assembly is typically comprised of a fixed member which is fixedly attached to the frame of the travel trailer and a sliding member which telescopes from the fixed member and couples with the extendable member so that the extendable member moves with the sliding member of each support rail assembly. Furthermore, the sliding member of each of the support rail assemblies is displaced with respect to the fixed member by an actuator assembly that typically comprises either an electrically powered linear rack and pinion drive mechanism or a hydraulic assembly which moves each of the sliding members so that the extendable member remains in an aligned state with respect to the travel trailer during the movement process. Moreover, the actuator assembly typically further includes push button control so that the user can conveniently place the extendable member in either the retracted or the deployed configuration.

Such an extendable member, when in the retracted configuration, is positioned so that the outer vertical wall aligns with the side wall of the travel trailer and so that the remaining walls, including the lower horizontal wall, of the extendable member are positioned within the interior living space of the travel trailer. Consequently, in the retracted configuration, the housing of the travel trailer forms a more aerodynamic shape having a width and length that are within the maximum allowed width and length.

However, when the extendable member is placed into the deployed configuration, the extendable member extends from the travel trailer so that the walls of the extendable member extend from the opening of the housing of the travel trailer so as to align the opening of the extendable member with the opening of the side wall of the travel trailer. Consequently, the floor of the extendable member extends through the opening of the housing so that the effective living area of the travel trailer is increased. Furthermore, the walls of the extendable member effectively become exterior walls of the travel trailer so that the interior living space of the travel trailer remains enclosed.

Typically, the largest variety of travel trailers, otherwise known as fifth wheel travel trailers, are manufactured so that the weight of the trailer is partially supported by a plurality of wheels that extend from a chassis of the trailer and partially supported at the front by the towing vehicle. In particular, such travel trailers are comprised of a raised front section that is adapted to substantially extend over a supporting portion of the towing vehicle and a lowered rear section that is positioned above the plurality of wheels of the travel trailer. Furthermore, such travel trailers may further be comprised of a midsection that encloses a portion of a plumbing assembly which includes a fresh water storage tank and a waste water storage tank. Thus, typical fifth wheel travel trailers are typically formed with multiple levels which often include a rear section having a lowered floor area, a front section having a raised floor area, and a middle section having an intermediately elevated floor area.

In the typical fifth wheel travel trailer, the living space is typically segmented along the boundaries between the lower, middle, and upper sections of the travel trailer. In particular, since the rear section is closest to the ground and since the rear section is the largest of the three sections, the rear section typically comprises the living room and kitchen that are both accessible from the outside by an entry door positioned along a side wall of the housing of the travel trailer that opens into the lower level. Furthermore, since the middle section often comprises the plumbing assembly, the middle section often comprises the bathroom. Moreover, since the front section has the least amount of headroom and is the most remote of all three sections, the front section often comprises the bedroom.

In known fifth wheel travel trailers having extendable members, the extendable members are somewhat limited in that they extend from only a single section of the travel trailer. In particular, known extendable members extend from either the rear section, the midsection, or the front section of the trailer. For example, the typical extendable travel trailer is comprised of a first extendable member having a single level floor that extends from a first opening in the side wall of the travel trailer in the vicinity of the rear section so as to increase the size of the living room. Further, the typical trailer also includes a second extendable member having a single level floor that extends from a second opening of the side wall of the travel trailer in the vicinity of the front section so as to increase the size of the bedroom.

Although such recreational travel trailers provide a significant increase in living space, the increase is not as great as it could be. In particular, since the known extendable member can only extend from a single level floor of the recreational travel trailer, the width of the known extendable member is limited by the dimensions of the corresponding trailer section. Consequently, such extendable members provide a supplemental living space that is sometimes relatively narrow in size, thereby preventing relatively large items from being positioned within the extendable member. For example, although the second extendable member from the aforementioned example enables a bed to be mounted within the supplemental living space formed therein, it is not capable of including the bathroom along with the bed due to the limited size of the front section of the travel trailer and due to the inability of known extendable members to encompass multiple floor levels. Furthermore, since structural limitations require adjacent extendable members to be spaced sufficiently far apart, it is generally not feasible to position extendable members adjacent to each other, wherein the extendable members extend from both the middle and front sections of the travel trailer. Thus, it is generally not feasible to position both the bathroom and the bedroom in one or more extendable members of the travel trailer. Consequently, either the middle section or the front section of the known travel trailer is not fully utilized.

Although special purpose commercial grade mobile structures have been developed with extendable members having multiple floor levels, such known commercial structures utilize elaborate and expensive actuator assemblies for manipulating the extendable member between the retracted configuration and the deployed configuration. In particular, in the Applicants previous design of a commercial grade movable concession booth having a multilevel extendable member that forms a supplemental space therein, the actuator assembly comprises an elaborate system of cables that engage with an elaborate system of pulleys in a relatively complicated manner so as to effectively move the relatively large multilevel extending member between the retracted configuration and the deployed configuration. However, since the fabrication of such known actuator assemblies require a substantial amount of manual effort and materials, the implementation of such known multilevel extendable members in the recreational travel trailer industry is generally prohibited due to the high costs involved.

Another problem associated with known travel trailers having extendable members is that the furnishings that attach to the extendable members are somewhat limited in size. For example, it is usually not practical to include a laterally positioned wardrobe having a substantially elongated shape as part of the extendable member. In particular, due to the extended length of the wardrobe and the limited space within the travel trailer, the wardrobe may inhibit the extendable member from being placed in the retracted configuration. Furthermore, even if it is possible for such an extendable member to be placed in the retracted configuration, it is likely that the wardrobe will limit access to the interior regions of the travel trailer. Consequently, it is often the case that the wardrobe must be fixedly positioned to a front region of the bedroom, thereby limiting the space within the bedroom.

From the foregoing, therefore, it will be appreciated that there is a need for an improved travel trailer that can be configured with a living space that is greater than that of travel trailers known in the art. In particular, there is a need for an improved travel trailer that comprises an improved extendable member that can be manipulated between a retracted configuration and a deployed configuration so that the extendable member encompasses multiple sections of the travel trailer so as to increase of the width of the extendable member over that of extendable members known in the art. To this end, there is a need for the improved extendable member to include a multilevel floor so as to enable the extendable member to encompass multiple sections of the travel trailer which could include a bathroom and a bedroom in tandem.

Furthermore, there is a need for the improved extendable member to include an actuator assembly that is capable of moving the extendable member between the retracted and the deployed configurations in a manner that does not result in the extendable member becoming immobilized due to improper alignment between the extendable member and the travel trailer. Moreover, there is a need for the actuator assembly to be relatively simple so that it can be manufactured in a cost effective manner. Additionally, there is a need for the improved extendable member to include a configurable wardrobe having an elongated shape in an extended configuration and a non-elongated shape in a retracted configuration so that the wardrobe can be laterally positioned in the bathroom region of the improved extendable member of the travel trailer in a non-interfering manner so as to free up space in the bedroom.

SUMMARY OF THE INVENTION

The aforementioned needs are satisfied by the travel trailer of the present invention comprising a frame, a set of wheels attached to the frame to permit rolling movement of the trailer over the ground, and a floor attached to the frame. In particular, the floor defines the inner living space of the trailer and the floor has a first vertical level positioned at a first height above the ground and a second vertical level positioned at a second height above the ground. The travel trailer further comprises a plurality of walls mounted on the floor so as to enclose the inner living space of the trailer and a pop-out assembly attached to a first wall of the plurality of walls of the trailer, the pop out assembly including a floor having a first and a second level and a plurality of walls mounted at the outer edges of the floor. In particular, the first and second level of the floor of the pop-out are respectively positioned adjacent the first and second vertical levels of the floor of the trailer attached to the frame. Furthermore, the pop-out assembly is movable between a first position such that the outer wall of the pop-out assembly is positioned adjacent the first wall and a second position wherein the pop-out assembly is extended outward from the first wall.

In one embodiment, the travel trailer further comprises a movement mechanism coupled with the pop-out assembly that moves the pop-out assembly between the first position and the second position. In particular, the movement mechanism comprises a first rail attached to a first end of the pop-out assembly, wherein the first rail is movable between a retracted and an extended position. Furthermore, the movement mechanism comprises a second rail attached to a second end of the pop-out assembly, wherein the second rail is movable between a retraced and an extended position. Moreover the movement mechanism further comprises a motor which is coupled with the first rail so as to be able to move the first rail between the retracted and extended position. Furthermore, the movement mechanism further comprises a linkage assembly that links the first and second rail so as to ensure that the first and second rail move between the retracted and the extended position simultaneously at the same rate.

In one embodiment, the linkage assembly comprises a first shaft member mounted to the travel trailer so as to extend generally horizontally at a first height above the ground so as to be rotatable, wherein the first shaft member is attached to the first rail so that rotation of the first shaft member results in corresponding movement of the first rail between the retracted and the extended position. The linkage assembly further comprises a second shaft member mounted to the trailer assembly so as to extend generally at a second height above the ground and so as to be rotatable, wherein the second shaft member is attached to the second rail so that rotation of the second shaft member results in movement of the second rail between the retracted and extended position. The linkage assembly further comprises a vertical linkage mechanism that is coupled to the first and second shaft members so that rotational movement of the first shaft member results in corresponding rotational movement of the second shaft member.

From the foregoing, it should be apparent that the improved pop-out assembly of the travel trailer of the present improved invention encompasses two floor levels of the travel trailer, therefore enabling the pop-out assembly to have a supplemental living space which is significantly greater than that of pop-out assemblies known in the art. Furthermore, the travel trailer of the present invention utilizes a simple yet effective linkage assembly that can be manufactured at low cost. These and other objects and advantages of the present invention will become more apparent from the following description taken in conjunction with the accompanying drawings.

BRIEF DESCRIPTION OF THE DRAWINGS

FIG. 3A is an overhead plan view of a two level actuator assembly of the travel trailer of FIG. 1 that actuates the two level extendable member between the retracted configuration and the deployed configuration;

FIG. 3B is a side elevational view of the actuator assembly of FIG. 3A;

FIG. 3C is a front elevational view of the actuator assembly of FIG. 3A;

FIG. 3D is a side view of a torque transfer assembly of the two level actuator assembly of FIG. 3A that induces a lower horizontal shaft and an upper horizontal shaft of the two level actuator assembly to rotate in a synchronous manner

DETAILED DESCRIPTION OF THE PREFERRED EMBODIMENT

Figure 1:
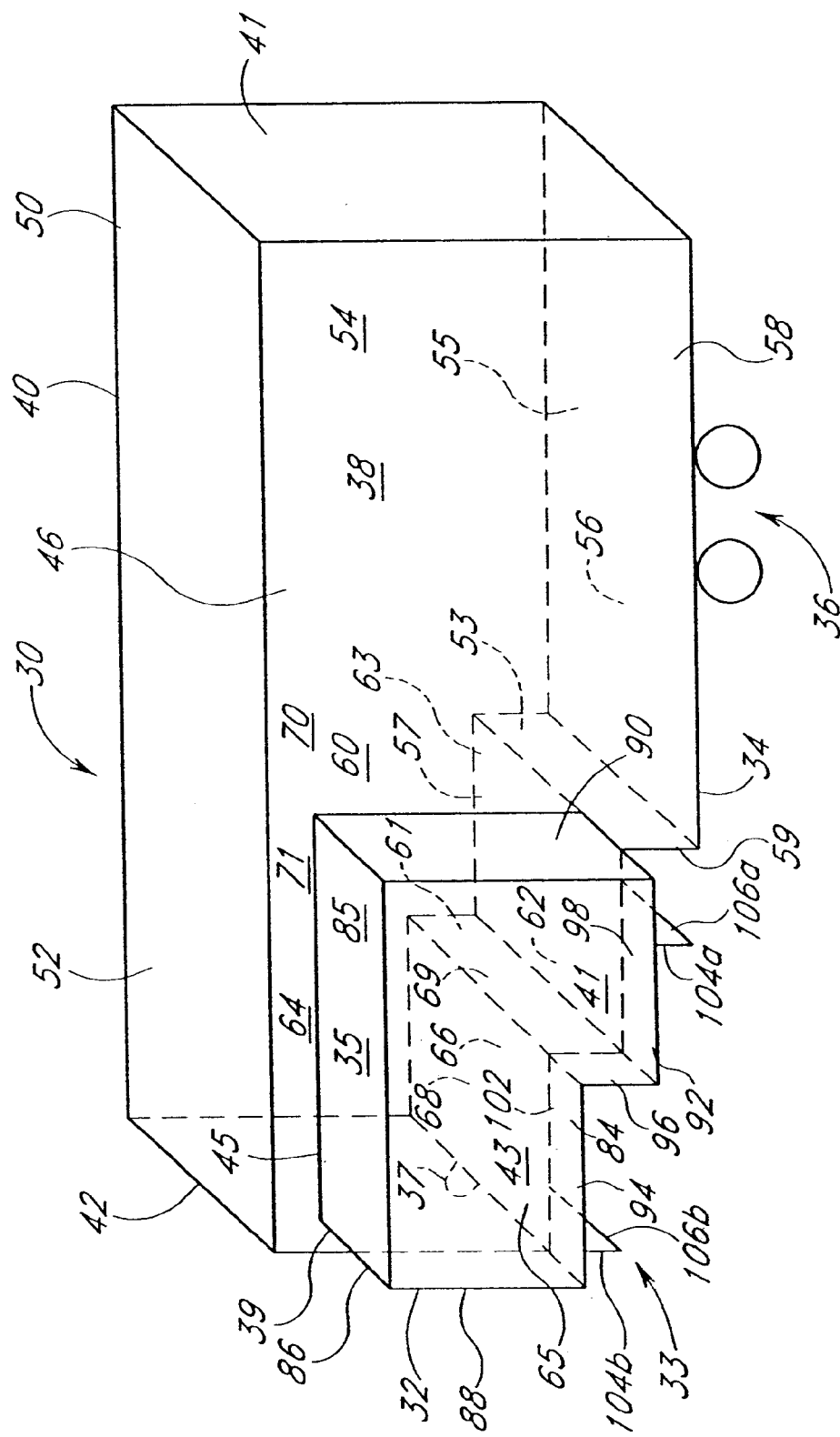
FIG. 1 is a perspective view of a recreational travel trailer of the present invention that comprises a two level extendable member.

Reference will now be made to the drawings wherein like numerals refer to like parts through out. In particular, FIG. 1 schematically illustrates a recreational fifth wheel travel trailer 30 comprised of a main housing 40 and a two level extendable housing 32, wherein the extendable housing 32 is shown extending from an opening 39 of the main housing 40 in a deployed configuration. As will be described in greater detail below, the two level extendable housing 32 can either be placed in the deployed configuration so as to effectively increase a living space 38 of the trailer 30 or be placed in a retracted configuration so as to provide that trailer 30 with a more suitable size and shape for being towed on a public road. Furthermore, although the preferred embodiment of FIG. 1 includes the extendable housing 32 that extends from the left side of the trailer 30, it will be appreciated that the extendable housing 32 could be adapted to extend from the right side of the trailer 30 in another embodiment.

In this application, the adjectives "front", "rear", "left", "right", "inboard", "outboard", "longitudinal", and "lateral" will be frequently used to indicate the spatial relationship between many of the elements of the trailer 30. In particular, the adjective front is used to indicate that the corresponding element is positioned proximal to a front end of the trailer 30 and the adjective rear is used to indicate that the corresponding element is positioned proximal to a rear end of the trailer 30, wherein the trailer 30 preferably travels on a road with the front end leading and the rear end lagging. Furthermore, the adjectives left and right are defined with respect to an observer who is looking at the trailer 30 along a direction that extends from the rear end of the trailer 30 to the front end of the trailer and are used to indicate that the corresponding element is either positioned adjacent to the left side of the trailer 30 or adjacent to the ride side of the trailer 30. Moreover, the adjective inboard refers to an element being positioned proximal to a medial line that extends from the rear end of the trailer 30 to the front end of the trailer 30 and the adjective outboard refers to an element being positioned distally from the medial line. Additionally, the adjectives longitudinal and lateral are used to indicate direction, wherein longitudinal refers to a horizontal direction that extends between the rear and front ends of the trailer 30, and wherein lateral refers to a horizontal direction that extends between the left and right sides of the trailer 30.

As generally shown in FIG. 1, the trailer 30 further comprises a frame 34 that structurally supports the trailer 30. Essentially, the frame 34 forms a multilevel structure and is constructed from conventional structural members in a manner known in the art so that the frame 34 structurally supports the main housing 40 of the trailer 30. In the preferred embodiment, the frame 34 is comprised of a rear horizontal platform 58, a front horizontal platform 65, and a middle horizontal platform 63 interposed therebetween. However, it will be appreciated that, in other embodiments, the frame 34 could be comprised of a different number of platforms. Furthermore, the frame 34 comprises a rear vertical riser 59 that joins the rear horizontal platform 58 with the middle horizontal platform 63 so that the platform 63 is elevated above the platform 58. Moreover, the frame 34 comprises a front vertical riser 61 that joins the middle horizontal platform 63 with the front horizontal platform 65 so that the platform 65 is elevated above the platform 63.

In the preferred embodiment, the platforms 58, 63, and 65 of the frame 34 are formed from steel structural members. However, it will be appreciated that frame 34 could be constructed in alternative manner in other embodiments of the invention. For example, the rear platform, in an alternative embodiment, could be formed of steel members and extended in length so as to join with a single steel riser that joins with the front platform formed of steel. Furthermore, the middle platform, in this alternative embodiment, could comprise a wooden structure that mounts at the front of the rear platform.

As generally shown in FIG. 1, the main housing 40 is mounted above the frame 34 and is essentially formed of a plurality of planer walls that are joined together in a known manner and mounted to the frame 40 in a known manner so as to form the space 38 above a plurality of floor levels. In particular, the main housing 40 includes a front vertical wall 42, a rear vertical wall 44, a left side or drivers side vertical wall 46, a right side or passenger side vertical wall 50, and an overhead vertical wall 52 that all join together in a mutually orthogonal manner to form a substantially rectangular shaped enclosure having the living space 38 formed therein. Furthermore, the main housing 40 is further comprised of a rear lower horizontal wall 55, a middle lower horizontal wall 57, and an front lower horizontal wall 68 that are mounted directly above the rear platform 58, middle platform 63, and front platform 65, respectively, of the frame 34.

Moreover, the upper surfaces of the rear, middle, and front horizontal walls 55, 57, and 68 respectively form a rear floor 56, a middle floor 62, and a front floor 66. In particular, the middle floor 62 is elevated above the rear floor 56 and separated from the rear floor 56 by a rear step 53 that rises from the rear floor to the middle floor. Furthermore, the front floor 66 is elevated above the middle floor 62 and separated from the middle floor 62 by a front step 69 that rises from the middle floor 62 to the front floor 66. Consequently, the living space 38 formed within the main housing 40 is segmented into a rear space 54 that encompasses the rear floor 56, a middle space 60 that encompasses the middle floor 62, and a front space 64 that encompasses the front floor 66.

As generally shown in FIG. 1, the trailer 30 further comprises a known wheel assembly 36 having a plurality of rotatable wheels that attaches to the frame so as to enable the trailer 30 to be transported on a road. Furthermore, the trailer 30 further comprises a known male hitch assembly 37 at the front of the trailer 30 that couples with a known female hitch assembly of a towing vehicle so that the trailer 30 can be towed by the towing vehicle.

As generally shown in FIG. 1, the two level extendable housing 32 that is adapted to extend from the main housing 40 of the trailer 30 is formed of a plurality of walls that join together to form a supplemental living space 35 therein. In particular, the housing 32 comprises an outboard vertical wall 84, an overhead horizontal wall 86, a front lateral vertical wall 88, a rear lateral vertical wall 90, a rear lower horizontal wall 92 having a lower floor 98 formed thereon, a front lower horizontal wall 94 having an upper floor 102 formed thereon, and a middle lateral vertical wall 96 that collectively join together in a substantially orthogonal manner. Specifically, the middle vertical wall 96 vertically offsets the rear lower horizontal wall 92 from the front lower horizontal wall 94 so that the upper floor 102 is elevated above the lower floor 98. Furthermore, the extendable housing 32 includes an inboard opening 85 that allows access to the supplemental living space 35, wherein the opening 85 is positioned opposite of the outboard vertical wall 84. Moreover, the supplemental living space 35 comprises a lower space 41 that encompasses the lower floor 98 and an upper space 43 that encompasses the upper floor 102 of the extendable housing 32. As will be described in greater detail below, the lower space 41, in the preferred embodiment, forms a part of a bathroom area 73 and the upper space 43 forms a part of a sleeping area 77 of the trailer 30.

As generally shown in FIG. 1, the main housing 40 of the trailer 30 includes the opening 39 that enables the two level extendable housing 32 to extend from the main housing 40. In particular, the opening 39 is formed with a perimeter 45 having a shape that enables the two level extendable housing 32 to extend from the opening 39 when the extendable housing 32 is placed into the deployed configuration. Moreover, the opening 39 is formed with a shape that provides a substantially airtight seal when the extendable housing 32 is placed in the retracted configuration. Furthermore, the opening 39 is positioned adjacent to the middle and front spaces 60 and 64 of the trailer 30 so as to allow the extendable housing to extend into and out of the middle and front spaces 60 and 64 of the trailer 30.

As generally shown in FIG. 1, the two level extendable housing 32, in the deployed configuration, extends through the opening 39 of the main housing 40 along a direction that is substantially perpendicular to the left side vertical wall 46 so that the opening 85 of the extendable housing 32 substantially aligns with the opening 39 of the main housing 40 so as to provide the trailer 30 with an expanded interior middle space 70 and an expanded interior front space 71. In particular, the extendable housing 32 is positioned so that the middle floor 62 of the main housing 40 extends into the lower floor 98 of the extendable housing 32 so as to combine the middle space 60 of the main housing 40 with the lower space 41 of the extendable housing 32 into the expanded middle space 70. Furthermore, the extendable housing 32 is positioned so that the front floor 66 of the main housing 40 extends into the upper floor 102 of the extendable housing 32 so as to combine the front space 64 of the main housing 40 with the upper space 43 of the extendable housing 32 into the expanded front space 71.

As schematically shown in FIG. 1, the two level extendable housing 32 is coupled to an actuator assembly 33 that moves the two level housing 32 between the deployed configuration and the retracted configuration. In the preferred embodiment, the actuator assembly 33 is comprised of a rear horizontal slidable rail 106a having a rear upwardly extending vertical bracket 104a at an outboard end of the rail 106a and a front slidable rail 106b having a front upwardly extending vertical bracket 104b at an outboard end of the rail 106b, wherein the rear and front brackets 104a and 104b attach to the extendable housing 32 so that movement of the rails 106a and 106b produce a corresponding movement of the extendable housing 32 between the extended and retracted positions.

As schematically shown in FIG. 1, the rails 106a and 106b laterally extend from the frame 40 along different horizontal planes. In particular, the rail 106a extends from the middle platform 63 of the frame 34 and is positioned beneath the rear horizontal wall 92 of the extendable housing 32 so that the rear bracket 104a can attach to the extendable housing 32 in a manner which will be described in greater detail below. Similarly, the rail 106b extends from the front platform 65 of the frame 34 and is positioned beneath the front horizontal wall 94 of the extendable housing 32 so that the front bracket 104b can attach to the extendable housing 32. As will be described in greater detail below in connection with FIGS. 3A–3B, the actuator assembly 33 is further comprised of a two level drive assembly 47 that moves the vertically offset rails 106a and 106b in a lateral manner so as to move the extendable housing 32 between the deployed configuration and the retracted configuration.

Figure 2A:
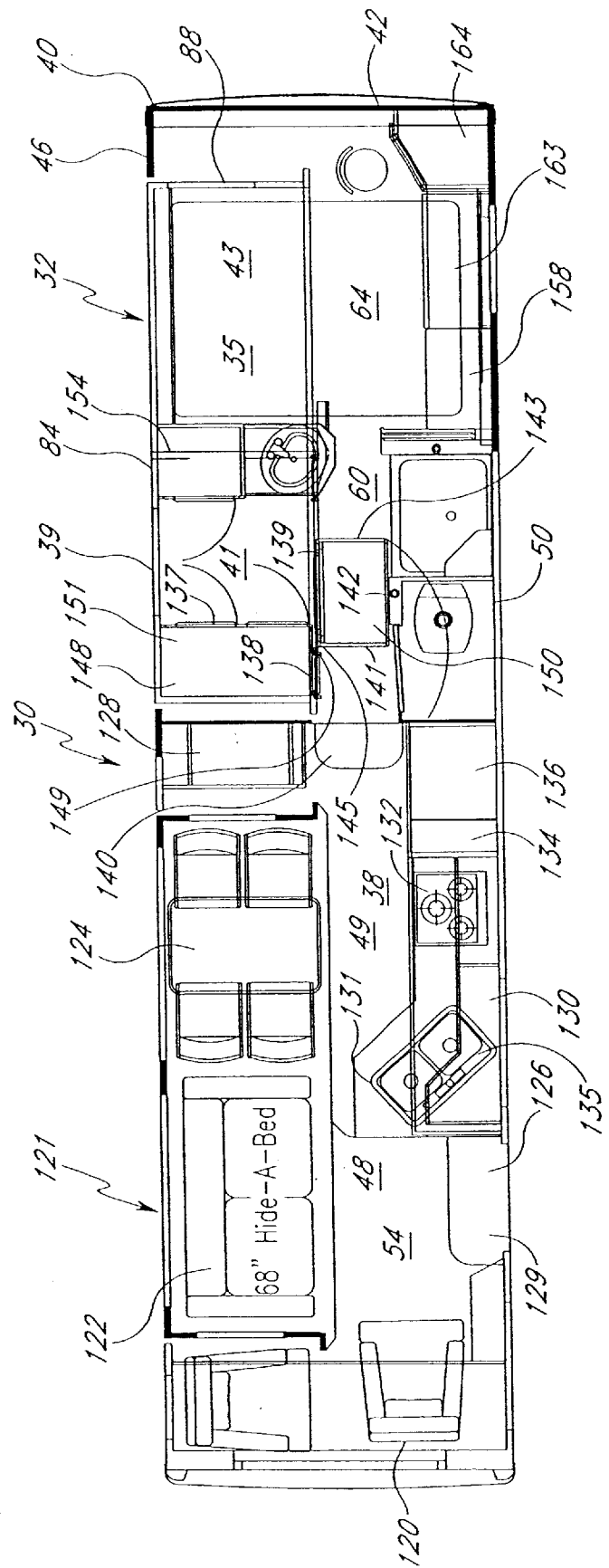
FIG. 2A is an overhead plan view of the travel trailer of FIG. 1 showing the two level extendable member in a retracted configuration.
Figure 2B:
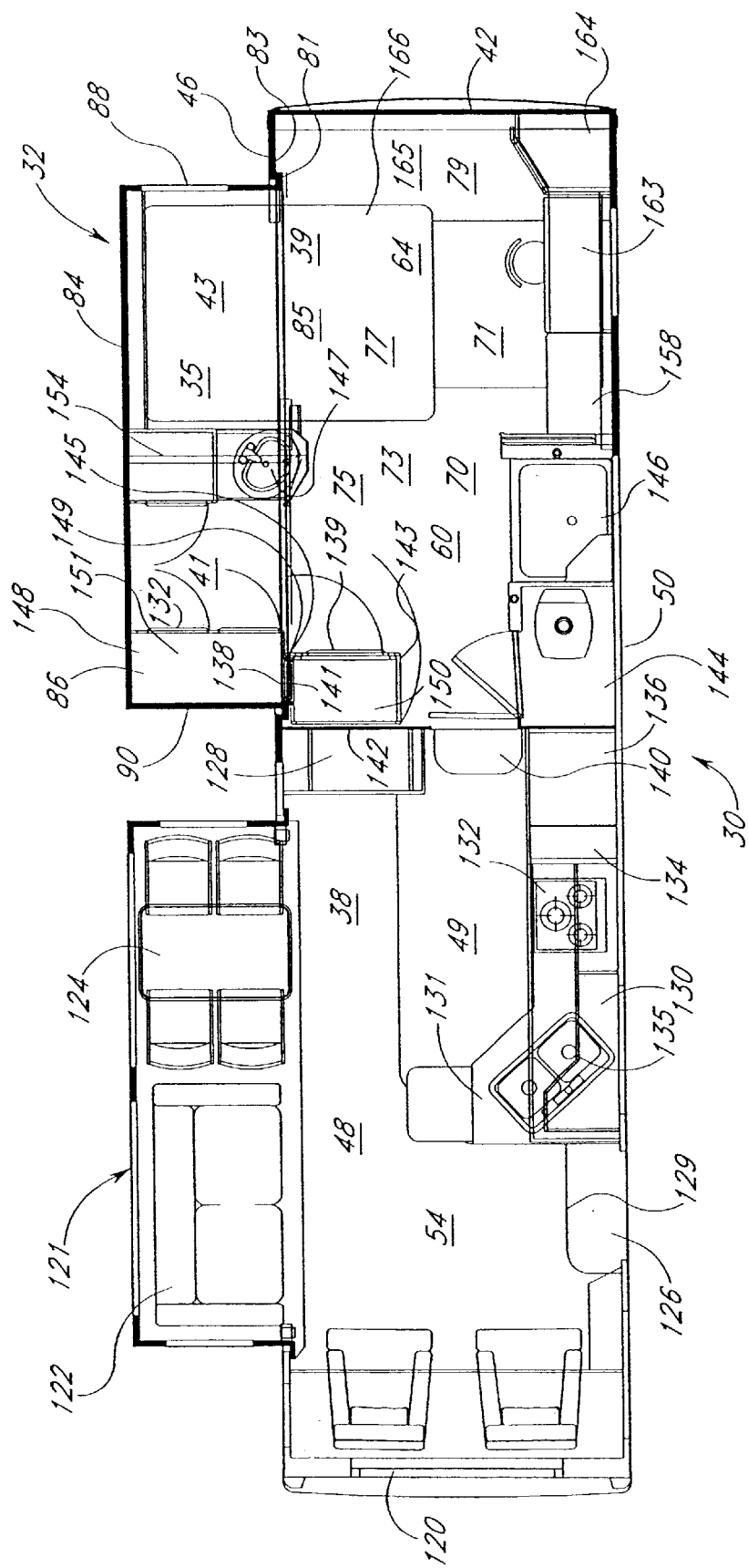
FIG. 2B is an overhead plan view of the travel trailer of FIG. 1 showing the two level extendable member in a deployed configuration.

Reference will now be made to FIGS. 2A and 2B which provide a detailed plan view of the living space 38 within the trailer 30 of FIG. 1. In particular, FIG. 2A illustrates the trailer 30 with the extendable housing 32 in the retracted configuration and FIG. 2B illustrates the trailer 30 with the extendable housing 32 in the deployed configuration. Moreover, in FIGS. 2A and 2B, the front of the trailer 30 is shown on the right hand side of the page and the rear of the trailer 30 is shown in the left hand side of the page.

As shown in FIG. 2A, the extendable housing 32, in the retracted configuration, extends into the main housing 40 so that the extendable housing 32 is substantially positioned within the middle and front spaces 60 and 64 of the living space 38 of the trailer 30. Consequently, the outboard vertical wall 84 of the extendable housing 32 is aligned with the opening 39 of the main housing 40 so as to form the trailer 30 with a more aerodynamic shape and so as to reduce the effective width of the trailer 30 while the trailer is being towed.

As shown in FIG. 2B, the extendable housing 32, in the deployed configuration, extends out of the opening 39 of the left vertical side wall 46 of the main housing 40 so that the opening 85 of the extendable housing 32 aligns with the opening 39 of the main housing 40. Thus, the lower and upper spaces 41 and 43 of the supplemental living space 35 of the extendable housing 32 combine with the middle and front spaces 60 and 64 of the living space 38 of the housing 40 to form the expanded middle and front spaces 70 and 71 of the trailer 30.

As shown in FIGS. 2A and 2B, the extendable housing 32 further comprises a lip 81 that outwardly extends from the inboard edges of the front, overhead, and rear walls 88, 86, and 90 of the extendable housing 32 in a substantially orthogonal manner. In particular, when the extendable housing 32 is placed in the deployed configuration of FIG. 2B, the lip 81 flushly contacts an inner surface 83 of the main housing 40 adjacent the opening 39 of the left side vertical wall 46 of the main housing 40 so as to partially support the extendable housing 32 in the deployed configuration. As will be described below in connection to FIG. 4B, the actuator assembly 33 provides additional support to the extendable housing 32 in the extended position.

As shown in FIGS. 2A and 2B, the preferred embodiment of the trailer 30 further comprises a conventional single level extendable housing 121 having a deployed configuration and a storage configuration. In particular, the single level extendable housing 121, when in the deployed configuration as shown in FIG. 1B, extends through the main housing 40 so as to increase the rear space of the trailer 30. Furthermore, the single level extendable housing 121, when in the retracted configuration as shown in FIG. 1A, is substantially positioned within the main housing 40 so as to provide the trailer 30 with a shape and size that is more suitable for traveling.

As shown in FIGS. 2A and 2B, the rear space 54 of the trailer 30 includes a living room area 48 and a kitchen area 49. In particular, the living room area 48 includes a plurality of recliner chairs 120, a hide-a-bed 122, a set of dining furniture 124, an entertainment center 128 for storing a television, and an entry area 129 adjacent an entry door 126 which is positioned within the right side vertical wall 50 of the main housing 40. Moreover, the hide-a-bed 122 and the set of dining furniture 124 are positioned within the single level extendable housing 121 so that the hide-a-bed 122 and the set of dining furniture 124 are displaced away from the kitchen area 49 when the single level extendable housing 121 is placed into the deployed configuration. Furthermore, the kitchen area 49 includes a cabinet assembly 130 that comprises a kitchen counter 131, a stove 132, a food pantry 134, a refrigerator 136, a kitchen sink 135, and a step 140 that provides easy access to the elevated expanded middle space 70 of the trailer 30.

As shown in FIG. 2B, the expanded middle space 70 comprises a bathroom area 73 and a dressing room area 75. In particular, the bathroom area 73 includes a toilet closet 144, a shower 146, and a bathroom sink 147. Furthermore, the dressing room area 75 includes a movable cabinet such as a foldable wardrobe assembly 151 having a deployed configuration and a retracted configuration that will be described in greater detail below and a storage cabinet 154. Moreover, the foldable wardrobe assembly 151, the storage cabinet 154, and the bathroom sink 147 are attached to the two level extendable housing 32 within the lower space 41 of the housing 32 so that the assembly 151, cabinet 154 and sink 147 are displaced away from the toilet closet 144 and shower 146 when the housing 32 is placed into the deployed configuration (FIG. 2B). To accommodate movement of the sink 147 with respect to the frame 34, the sink 147 includes a known flexible hose assembly that communicates a faucet of the sink 147 with a fresh water reservoir and communicates a drain of the sink 147 with a waste water reservoir in a manner known in the art.

As shown in FIGS. 2A and 2B, the foldable wardrobe assembly 151 comprises a stationary cabinet 148 that is fixedly mounted to the two level extendable housing 32 within the lower space 41 of the housing 32, and a movable cabinet 150 which is pivotally mounted to the stationary cabinet by way of a hinge 149 so that the rotational axis of the hinge 149 is aligned in a vertical direction. As shown in FIG. 2B, the stationary cabinet 148 includes a front side 137 and an inboard side 138 and the movable cabinet 150 includes a front side 139, an outboard side 141, an inboard side 143, and a rear side 142, wherein the front and rear sides 139 and 142 are wider than the inboard and outboard sides 141 and 143. Furthermore, the hinge 149 couples with the inboard side 138 of the stationary cabinet 148 and further couples with the movable cabinet 150 along a corner 145 that connects the front side 139 with the outboard side 141 of the movable cabinet 150.

As shown in FIG. 2A, the foldable wardrobe assembly 151 is placed into the retracted configuration by rotating the movable cabinet 150 about the hinge 149 so that the wider front side 139 of the movable cabinet 150 is substantially aligned with the inboard side 138 of the stationary cabinet 148. As a result, the extendable housing 32 is able to be placed in the retracted configuration so that the rear side 142 of the movable cabinet 150 is flushly positioned adjacent the toilet closet 144.

As shown in FIG. 2B, when the extendable housing 32 is placed in the deployed configuration, a space is created with enables the foldable wardrobe assembly 151 to be placed into the deployed configuration. In particular, the movable cabinet 150 is rotated about the hinge 149 so that the outboard side 141 of the movable cabinet 150 substantially aligns with the inboard side 138 of the stationary cabinet 148. Thus, the foldable wardrobe assembly 151 forms an elongated shape which is similar to that of known wardrobes. Moreover, the fully deployed extendable housing 32 provides sufficient room between the movable cabinet 150 and the toilet closet 144 so that a person can walk therebetween and so that a person can access the toilet closet 144.

As shown in FIG. 2B, the expanded front space 71 comprises a sleeping area 77 and a study area 79. In particular, the sleeping area 77 includes a queen sized bed 166 and an access space 165 adjacent the front vertical wall 42 of the main housing 40 that enables individuals to access the bed 166 in a convenient manner. Furthermore, the study area 79 includes a linen closet 158, a table 163, a chair 162, and a corner cabinet 164.

As shown in FIGS. 2A and 2B, the bed 166 is fixedly attached to the extendable housing 32 so that the bed 166 extends through the opening 39 of the main housing 40 when the extendable housing 32 is placed in the deployed configuration. Furthermore, the inboard end of the bed 166 is positioned under the linen closet 158 and table 163 when the extendable housing 32 is placed in the retracted configuration. Moreover, the bed 166 extends away from the linen closet 158, the table 163, and the corner cabinet 164 when the extendable housing 32 is placed in the deployed configuration so as to form a space therebetween that allows individuals to access the sleeping area 77 and study area 79.

It will be appreciated that the two level extendable housing 32 provides the trailer 30 with a more luxurious atmosphere. In particular, the expanded middle space 70 of the trailer 30 which results from the extendable housing 32 being placed in the deployed configuration provides ample room for individuals to conveniently utilize the bathroom and dressing areas 73 and 75. In contrast, travel trailers known in the art, including those having known extendable housings, typically comprise relatively small bathroom and dressing areas.

It will also be appreciated that the enlarged middle space 70 of the trailer 30 combined with the retractable nature of the foldable wardrobe assembly 151 enables the assembly 151 to be positioned outside from the sleeping area 77. Consequently, the sleeping area 77 is able to include the access space 165 so that individuals can conveniently access the bed 166. In contrast, travel trailers known in the art that utilize extendable housings typically position a wardrobe adjacent a front wall of the trailer adjacent to a sleeping area so that the space within the sleeping area is substantially reduced.

Reference will now be made to FIG. 3A–FIG. 3D which provide detailed illustrations of the actuator assembly 33 used to move the extendable housing 32. In particular, FIG. 3A is an overhead plan view of the actuator assembly 33, wherein the left side of FIG. 3A corresponds to the rear end of the actuator assembly 33 and the right side of FIG. 3A corresponds to the front end of the actuator assembly 33. Furthermore, FIG. 3B is a side elevational view of the actuator assembly 33, wherein the left side of FIG. 3B corresponds to the rear end of the actuator assembly 33 and the right side of FIG. 3B defines the front end of the actuator assembly 33. Moreover, FIG. 3C is a front elevational view of the actuator assembly 33. Additionally, FIG. 3D is a side elevational view of a torque transfer assembly 172 of the actuator assembly 33 from the perspective of an observer who is looking along the elongated axis of a rear horizontal shaft 176a.

As shown in FIGS. 3A–3C, the actuator assembly 33 is comprised of a rear rail assembly 170a, a front rail assembly 170b, and a drive assembly 171 interposed therebetween, wherein the front rail assembly 170b is elevated above the rear rail assembly 170a. As best shown in FIGS. 3A and 3C, the rear rail assembly 170 is comprised of a rear fixed support guide 108a and the rear horizontal slidable rail 106a that extends from the support guide 108a in a telescoping manner. Specifically, the rail 106a is adapted to slidably extend from an elongated channel formed within the support guide 108a so that the motion of the rail 106a is restricted to be along the elongated channel of the support guide 108a. Furthermore, a substantial portion of the slidable rail 106a will always remain within the support guide 108a so as to enable the rail 106a to function as a cantilever as will be described in greater detail below.

As shown in FIGS. 3A–3C, the front rail assembly 170b is substantially similar to the rear rail assembly 170a and is positioned so as to be elevated above the rear rail assembly 170a. As best shown in FIGS. 3A and 3C, the front rail assembly 170b is comprised of a front fixed support guide 108b and the front horizontal slidable rail 106b that extends from the support guide 108b in a telescoping manner. Specifically, the rail 106b is adapted to slidably extend from an elongated channel formed within the support guide 108b so that the motion of the rail 106b is restricted to be along the elongated channel of the support guide 108b. Furthermore, a substantial portion of the slidable rail 106b will always remain within the support guide 108b so as to enable the rail 106b to function as a cantilever as will be described in greater detail below.

As shown in FIGS. 3A and 3C, the front and rear rail assemblies 170a and 170b are preferably positioned so that the support guides 108a and 108b are aligned in a parallel manner and so that the outboard ends of the support guides 108a and 108b are both positioned in a common plane which is perpendicular to the elongated axis of both the support guides 108a and 108b. Furthermore, the rear slidable rail 106a is adapted with a plurality of uniformly spaced rack groves 173a along a lower surface of the rail 106a that enable the slidable rail 106a to form a portion of a rear rack and pinion assembly 182a. Similarly, the front slidable rail 106b is adapted with a plurality of uniformly spaced rack groves 173b along a lower surface of the rail 106b that are substantially similar to the groves 173a of the rear rail 106a that enable the slidable rail 106b to form a portion of a front rack and pinion assembly 182b that is substantially similar to the rear rack and pinion assembly 182a.

As schematically shown in FIGS. 3A and 3B, the drive assembly 171 of the actuator assembly 33 is comprised of a rear pinion 175a, a rear horizontal shaft 176a, the torque transfer assembly 172, a front horizontal shaft 176b, a front pinion 175b which is substantially similar to the rear pinion 175a, and an electric motor 183. In particular, the rear pinion 175a is fixedly attached at a rear end of the rear horizontal shaft 176a and the front pinion 175b is fixedly attached at a front end of the front horizontal shaft 176b. Furthermore, the rear and front horizontal shafts 176a and 176b are rotatably mounted so that the rotational axes of the front and rear shaft 176a are parallel to each other and both lie in a substantially common vertical plane. Moreover, the rear horizontal shaft 176a is positioned so that the rear pinion 175a engages with the plurality of rack grooves 173a of the rear slidable rail 106a so as to form the rear rack and pinion assembly 182a. Additionally, the front horizontal shaft 176b is positioned so that the front pinion 175b engages with the plurality of rack grooves 173b of the front slidable rail 106b so as to form the front rack and pinion assembly 182b.

As schematically shown in FIGS. 3A and 3B, torque transfer assembly 172 couples the rear shaft 176a with the front shaft 176b so that a torque applied by the rear shaft 176a will be transferred to the front shaft 176b. In particular, the front end of the rear shaft 176a attaches to a descending portion of the torque transfer assembly 172 and a rear end of the front shaft 176b attaches to an ascending portion of the torque transfer assembly 172.

As shown in FIG. 3D, the preferred embodiment of the torque transfer assembly 172 comprises a lower gear 177a, an upper gear 177b, and a flexible chain 178 having a closed end. In particular, the front end of the rear shaft 176a is fixedly attached to the lower gear 177a in a conventional manner and the rear end of the front shaft 176b is fixedly attached to the upper gear 177b in a conventional manner. Furthermore, the lower and upper gears 177a and 177b are aligned in a common vertical plane and the appropriately sized chain 178 is positioned to surround the lower and upper gears 177a and 177b so that the chain 178 engages with both the lower and upper gears 177a and 177b. Consequently, when a torque is applied by the rear shaft 176a onto the lower gear 177a, the tension of the chain 178 will increase in an asymmetrical manner so that a torque is transferred to the upper gear 177b and front shaft 176b. Moreover, the diameters of the lower and upper gears 177a and 177b are substantially equal so that the rear shaft 176a and the front shaft 176b always have the same angular velocity.

As shown in FIGS. 3A and 3B, the electric motor 183 of the drive assembly 171 of the actuator assembly 33 couples with the rear shaft 176a of the drive assembly 171 in a well known manner so as to enable the electric motor 183 to activate the drive assembly 171. In particular, when electric current is passed through the electric motor 183, the electric motor 183 generates a torque which causes the rear and front shafts 176a and 176b to rotate at a substantially equal angular velocity. Consequently, the rear and front rack and pinion assemblies 182a and 182b will operate in a substantially identical manner so that the rear and front slidable rails 106a and 106b will both travel with the same linear velocity.

It will be appreciated that the actuator assembly 33 provides an effective means for moving the extendable housing 32. In particular, the electric motor 183 couples with the rear shaft 176a, thereby providing the rear shaft 176a with a torque that induces the rear shaft 176a and the rear pinion 175a into a state of rotation. Thus, since the rear pinion 175a is positioned so as to engage the rack grooves 173a of the rear slidable rail 106a, the rotating rear pinion 175a will induce the slidable rail 106a to move in a lateral manner.

Furthermore, the rear shaft 176a will provide the torque transfer assembly 172 with a torque so as to rotate the front shaft 176b. In particular, since the rear shaft 176a is coupled with the lower gear 177a of the torque transfer assembly 172, the rear shaft 176a applies a torque onto the lower gear 177a, thereby causing the chain 178 of the torque transfer assembly 172 to experience an asymmetrical tension. Thus, the chain 178 applies a torque onto the upper gear 177b which transfers the torque to the front shaft 176b, thereby inducing the shaft 176b and, consequently, the front pinion 175b into a state of rotation. Moreover, since the front and rear rack and pinion assemblies 182a and 182b are substantially identical to each other and since the lower and upper gears 177a and 177b are substantially identical to each other, the rotating front pinion 175b will induce the front slidable rail 106b into a state of motion that is substantially identical to the state of motion of the rear slidable rail 106a.

Consequently, since the rear and front slidable rails 106a and 106b are coupled with the extendable housing 32 in a manner that will be described in greater detail below, the synchronous movement of the rear and front slidable rails 106a and 106b will move the extendable housing 32 in an aligned manner. In particular, the synchronous movement of the rear and front slidable rails 106a and 106b will induce movement of the extendable housing so that the outboard wall 54 of the extendable housing 32 will tend to align with a plane which is parallel to the plane of the left side wall 46 of the main housing 40. Therefore, it is unlikely that the extendable housing 32 will become immobilized with respect to the frame 34 of the trailer 30 due to improper alignment between the extendable housing 32 and the main housing 40.

Figure 4A:
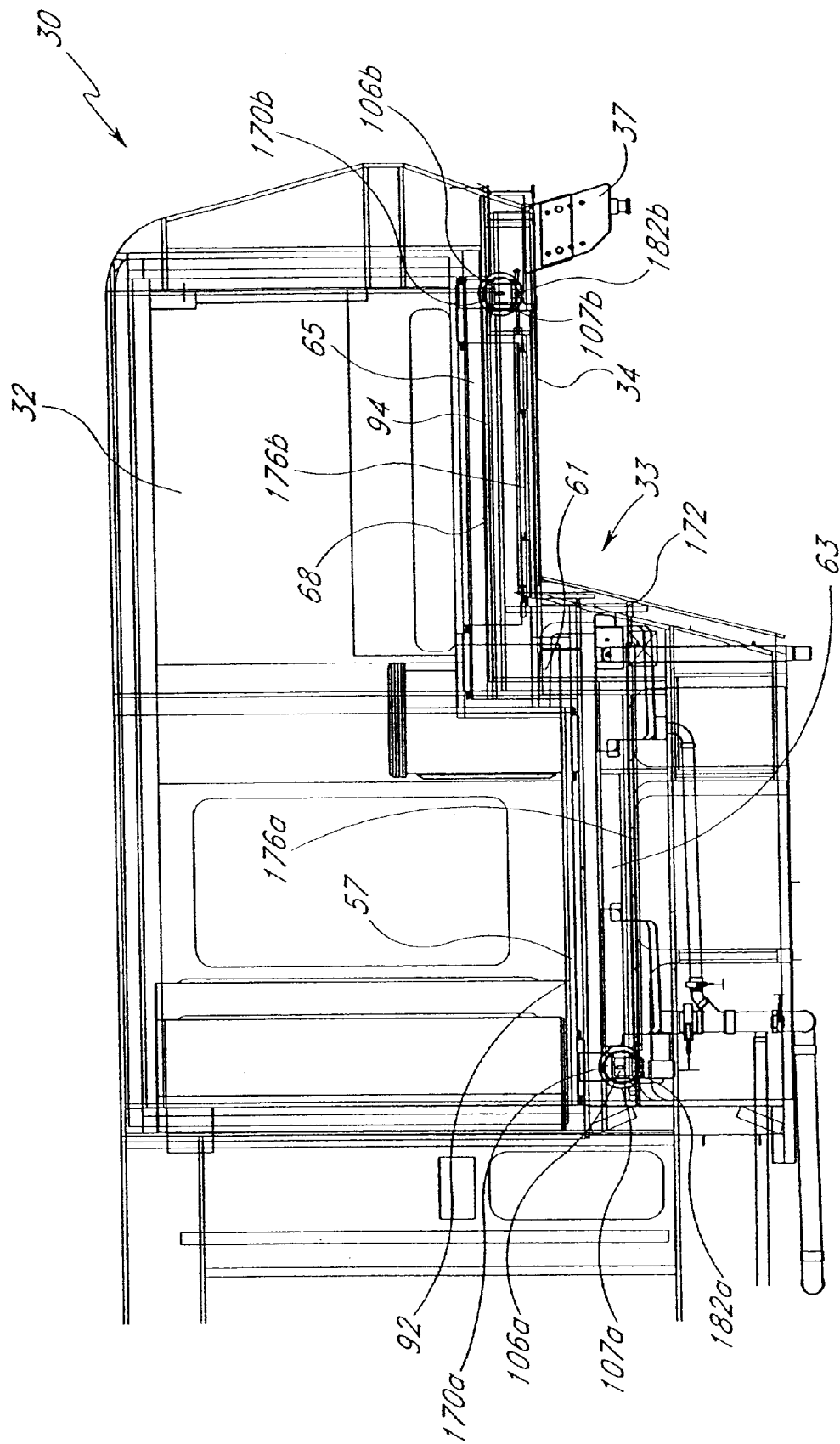
FIG. 4A is a side elevational view of the travel trailer of FIG. 1.
Figure 4B:
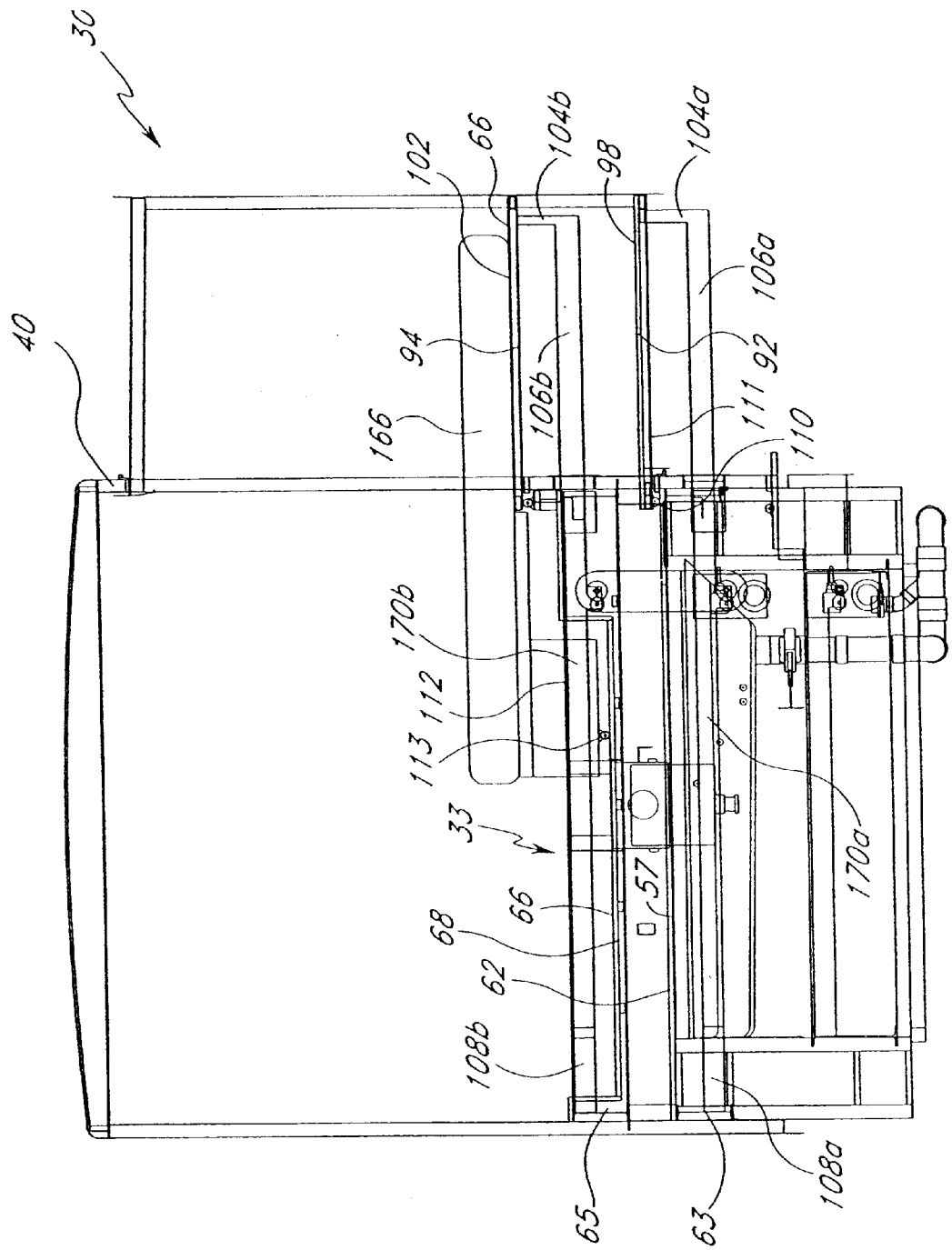
FIG. 4B is a front elevational view of the travel trailer of FIG. 1.

Reference will now be made to FIGS. 4A and 4B which illustrate the recreational travel trailer 30 in greater detail. In particular, FIG. 4A is a side elevational view of the trailer 30 of FIG. 1. Furthermore, FIG. 4B is a front elevational view of the trailer 30 of FIG. 1, wherein the extendable housing 32 is illustrated in the deployed configuration.

As shown in FIG. 4A, the actuator assembly 33 is mounted within the frame 34 of the trailer 30. In particular, the rear rail assembly 170a, the rear rack and pinion assembly 182a, and the rear horizontal shaft 176a of the actuator assembly 33 are positioned within the middle platform 63 of the frame 34 so that the rear horizontal shaft 176a is positioned in a substantially longitudinal manner and so that the rear rail assembly 170a is positioned in a lateral manner. Furthermore, the torque transfer assembly 172 of the actuator assembly 33 is positioned within the front vertical riser 61 of the frame 34. Moreover, the front horizontal shaft 176b, the front rack and pinion assembly 182b, and the front rail assembly 170b of the actuator assembly 33 are positioned within the front platform 65 of the frame 34 so that the front horizontal shaft 176b is positioned in a substantially longitudinal manner and so that the front rail assembly 170b is positioned in a lateral manner.

As shown in FIG. 4A, the rear and front horizontal slidable rails 106a and 106b of the actuator assembly 33, which are used to move the extendable housing 32 between the retracted and deployed configurations, are adapted to extend from the frame 34 of the trailer 30. In particular, the frame 34 includes a rear opening 107a at an outboard edge of the middle platform 63 adjacent the rear end of the middle platform 63 that enables the rear slidable rail 106a of the rear rail assembly 170a to extend from the frame 34 in a lateral manner. Similarly, the frame 34 includes a front opening 107b at an outboard edge of the front platform 65 adjacent the front end of the front platform 65 that enables the front slidable rail 106b of the front rail assembly 170b to extend from the frame 34 in a lateral manner.

As shown in FIGS. 4A and 4B, the actuator assembly 33 is positioned underneath the extendable housing 32 and the middle and front lower horizontal walls 57 and 68 of the trailer 30. In particular, the rear rail assembly 170a is positioned beneath the rear lower wall 92 of the extendable housing 32 and the front rail assembly 170b is positioned beneath the front lower wall 94 of the extendable housing 32. As will be described in greater detail below, the slidable rails 106a and 106b respectively couple with the rear lower wall 92 and the front lower wall 94 so as to enable the actuator assembly 33 to move the extendable housing 32 between the retracted and deployed configurations.

As shown in FIG. 4B, the lower floor 98 of the extendable housing 32 is vertically aligned with the middle floor 62 of the main housing 40 in a substantial manner and is adapted to travel across the middle floor 62 during movement of the extendable housing in a non-sliding manner. In the preferred embodiment, a known roller assembly 110 having a low profile is mounted to a lower surface 111 of the lower horizontal wall 92 of the extendable housing 32 adjacent the inboard edge of the lower horizontal wall 92 so as to be interposed between the lower surface 111 of the lower horizontal wall 92 and the middle floor 62 of the main housing 40 in a flush manner. Thus, when the extendable housing 32 is moved in a lateral manner, the roller assembly 110 will roll across the middle floor 62 so that the extendable housing 32 can be moved with a relatively small lateral force.

As shown in FIG. 4B, the preferred embodiment of the trailer 30 comprises the upper floor 102 of the extendable housing 32 that is substantially elevated above the front floor 66 of the main housing 40. In particular, this enables the outboard end of the bed 166 to be positioned directly on the upper floor 102 so that the inboard end of the bed 166 is sufficiently elevated above the front floor 66 of the main housing 40 so as to enable individuals to conveniently access the bed 166. However, it will be appreciated that, in another embodiment, the upper floor 102 of the extendable housing 32 could be adapted to align with the upper floor 66 of the main housing 40.

As shown in FIG. 4B, the inboard end of the bed 166 is supported by an inboard bed support 112 having a known roller assembly 113. In particular, the inboard bed support 112 is positioned beneath the inboard end of the bed so as to support the bed 166 as well as individuals who are sleeping on the bed 166. Furthermore, the roller assembly 113 is attached to a lower surface of the inboard bed support 112 so that the roller assembly 113 is flushly interposed between the inboard bed support 112 and the front floor 66 of the main housing 40. Thus, when the bed 166 is moved along with the extendable housing 32, the roller assembly 113 of the inboard bed support 112 will roll along the front floor 66 of the main housing 40 so as to reduce the lateral force that is required to move the extendable housing 32.

As shown in FIG. 4B, the rear and front rail assemblies 170a and 170b of the actuator assembly 33 are laterally mounted to the frame 34 of the trailer 30. In particular, the rear support guide 108a of the rear rail assembly 170a is laterally mounted within the middle platform 63 so that the slidable rail 106a can extend from the trailer 30 in a lateral manner and be supported by the rear support guide 108a. Furthermore, the front support guide 108b of the front rail assembly 170b is laterally mounted within the front platform 65 so that the slidable rail 106b can extend from the trailer 30 in a lateral manner and be supported by the front support guide 108b.

As shown in FIG. 4B, the slidable rails 106a and 106b engage with the extendable housing 32 so that they can maneuver and support the extendable housing 32. In particular, the rear and front slidable rails 106a and 106b laterally extends from the frame 34 of the trailer 30 so that the outboard ends of the rails 106a and 106b are substantially adjacent the outboard vertical wall 84 of the extendable housing 32. Furthermore, the upwardly extending bracket 104a connects the outboard end of the rear rail 106a with the rear lower horizontal wall 92 of the extendable housing 32 so that the rear rail assembly 170a can move the extending housing 32 and so that the rear slidable rail 106a of the rear rail assembly 170a can cantilever the extendable housing 32 in the deployed configuration. Moreover, the upwardly extending bracket 104b attaches the outboard end of the front rail 106b with the front lower horizontal wall 94 of the extendable housing 32 so that the front rail assembly 170b can move the extending housing 32 and so that the front slidable rail 106b of the front rail assembly 170b can cantilever the extendable housing 32 in the deployed configuration.

It will be appreciated that the two level extendable housing 32 of the trailer 30 extends across two floor levels of the trailer 30. Thus, the supplemental living space 35 formed within the extendable housing 32 is substantially greater than the supplemental living space of similarly positioned extendable housings of travel trailers known in the art. Consequently, the extendable housing 32 is able to encompass the bathroom area 73 as well as the sleeping area 77, so as to provide both of these areas with greater space.

It will also be appreciated that the actuator assembly 33 enables the extendable housing 32 to be maneuvered between the deployed and retracted configurations in a desirable manner. In particular, the vertically offset slidable rails 106a and 106b are adapted to respectively move the rear and front ends of the extendable housing 32 in a synchronous manner so as to maintain the extendable housing 32 in an aligned state with respect to the main housing 40.

It will also be appreciated that the actuator assembly can be manufactured at a relatively low cost. In particular, the components of the actuator assembly 33 can be readily fabricated and installed within the frame 34 of the trailer 32 using relatively simple installation techniques known in the art.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A travel trailer comprising:
   a frame;
   a set of wheels attached to the frame to permit rolling movement of the trailer over the ground;
   a floor attached to the frame, wherein the floor defines an inner living space of the trailer and wherein the floor has a first vertical level positioned at a first height above the ground and a second level positioned at a second height above the ground;
   a plurality of walls mounted on the floor so as to enclose the inner living space of the trailer and define a main housing;

a pop-out assembly attached to a first wall of the plurality of walls of the trailer, the pop-out assembly including a floor having a first level and a second level and a plurality of walls mounted at outer edges of the floor, wherein the first and second levels of the floor of the pop-out are respectively positioned adjacent the first and second vertical levels of the floor of the trailer attached to the frame wherein the pop-out assembly is movable between a first position such that an outer wall of the plurality of walls of the pop-out assembly is positioned adjacent the first wall and a second position wherein the pop-out assembly is extended outward from the first wall;

a movement mechanism coupled with the pop-out assembly so as to be able to move the pop-out assembly between the first position and the second position, wherein the movement mechanism comprises a first rail attached to a first section of the pop-out assembly, wherein the first rail is movable between a retracted position and an extended position, a second rail attached to a second section of the pop-out assembly, wherein the second rail is movable between a retracted position and an extended position, a linkage assembly that links the first and second rails so as to ensure that the first and second rails move between the retracted position and the extended position simultaneously at the same rate so as to maintain the pop-out assembly in an aligned state with respect to the main housing.

2. The travel trailer of claim 1, wherein the movement mechanism is comprised of at least one lineal actuator attached to the pop out assembly that is movable between a retracted position and an extended position.

3. The travel trailer of claim 2, wherein the movement mechanism further comprises a means for moving the linear actuator between the retracted position and the extended position.

4. The travel trailer of claim 3, wherein the movement mechanism comprises:

a motor which is coupled with the first rail so as to be able to move the first rail between the retracted and extended position.

5. The travel trailer of claim 4, wherein a linkage assembly comprises:

a first shaft member mounted to the pop-out assembly so as to extend generally horizontally at a first height above the ground so as to be rotatable wherein the first shaft member is attached to the first rail so that rotation of the first shaft member results in corresponding movement of the first rail between the retracted position and the extended position; and a second shaft member mounted to the pop-out assembly so as to extend generally at a second height above the ground and so as to be rotatable wherein the second shaft member is attached to the second rail so that rotation of the second shaft member results in movement of the second rail between the retracted and extended position;

a vertical linkage mechanism that is coupled to the first and second shaft members so that rotational movement of the first shaft member results in corresponding rotational movement of the second shaft member.

6. The travel trailer of claim 5, wherein the vertical linkage mechanism is comprised of a first sprocket attached to the first shaft member and a second sprocket attached to the end of the second shaft member and a continuous chain that is engaged with the first and second sprocket members so that rotation of the first sprocket member results in rotation of the second sprocket member.

7. The travel trailer of claim 1, wherein the travel trailer includes a main level, a first elevated level corresponding to the first vertical level and a second vertical level.

8. The travel trailer of claim 7, wherein the first elevated level comprises a bathroom and the first floor of the pop-out assembly expands floor area of the bathroom.

9. The travel trailer of claim 8, wherein the second elevated level comprises a bedroom having a bed positioned therein, wherein the bed is mounted so that a portion of the bed is positioned within the pop-out assembly so that when the pop-out assembly is in the second position the portion of the bed is positioned outside of the first wall of the plurality of walls.

10. The travel trailer of claim 1, further comprising a foldable wardrobe assembly that is positioned within the pop-out assembly so that the foldable wardrobe assembly moves with the pop-out assembly, wherein the foldable wardrobe assembly is foldable between a first orientation that enables the pop-out assembly to be moved into the first position and a second orientation when the pop-out assembly is moved into the second position wherein the width of the wardrobe assembly in the second orientation is greater than the width of the wardrobe assembly in the first orientation.

11. The travel trailer of claim 10, wherein the foldable wardrobe comprises:

a fixed cabinet attached to the pop-out assembly;

a hinge attached to a first surface of the fixed cabinet;

a pivoting cabinet attached to the hinge at a first surface of the pivoting cabinet so that the pivoting cabinet can be pivoted about the hinge.

12. The travel trailer of claim 11, wherein the first surface of the pivoting cabinet is oriented so as to be substantially perpendicular to the first surface of the fixed cabinet when the foldable wardrobe assembly is placed into the first orientation, and wherein the first surface of the pivoting cabinet is oriented so as to be substantially parallel with the first surface of the fixed cabinet when the foldable wardrobe assembly is placed into the second orientation.

13. A travel trailer comprising:

a frame;

a plurality of wheels attached to the frame to permit rolling movement of the trailer over the ground;

a multilevel floor attached to the frame, wherein the multilevel floor defines an inner living space of the trailer and wherein the multilevel floor includes a first level positioned at a first height above the plurality of wheels and a second level positioned at a second height above the plurality of wheels;

a main housing comprised of a plurality of walls mounted above the frame that enclose the inner living space of the trailer;

an extendable housing attached to a first wall of the plurality of walls of the trailer, the extendable housing including a multilevel floor having a first level and a second levels and a plurality of walls mounted at outer edges of the floor, wherein the first and second levels of the multilevel floor of the extendable housing are respectively positioned adjacent the first and second levels of the multilevel floor of the trailer attached to the frame, wherein the extendable housing is movable between a retracted configuration such that an outer wall of the plurality of walls of the extendable housing is positioned adjacent the first wall and a deployed configuration wherein the extendable housing is extended outward from the first wall; and an actuator assembly coupled with the extendable housing so as to be able to move the extendable housing between the retracted configuration and the deployed configuration, wherein the actuator assembly comprises a first rail attached to a first end of the extendable housing, wherein the first rail is movable between a retracted position and an extended position, a second rail attached to a second end of the extendable housing, wherein the second rail is movable between a retracted position and an extended position, a drive assembly that links the first and second rails so as to ensure that the first and second rails move between the retracted position and the extended position simultaneously at the same rate so as to maintain the extendable housing in an aligned state with respect to the main housing.

14. The travel trailer of claim 13, wherein an actuator assembly comprises:

a motor which is coupled with a drive assembly so as to be able to move the first rail and the second rail between the retracted and extended position.

15. The travel trailer of claim 14, wherein the drive assembly comprises:

a first shaft member mounted to the travel trailer so as to extend generally horizontally at a first height above the ground so as to be rotatable, wherein the first shaft member is coupled to the first rail so that rotation of the first shaft member results in corresponding movement of the first rail between the retracted and the extended position;

a second shaft member mounted to the travel trailer so as to extend generally at a second height above the ground and so as to be rotatable wherein the second shaft member is attached to the second rail so that rotation of the second shaft member results in movement of the second rail between the retracted and extended position; and a torque transfer assembly that is coupled to the first and second shaft members so that rotational movement of the first shaft member results in corresponding rotational movement of the second shaft member.

16. The travel trailer of claim 14, wherein the torque transfer assembly is comprised of a first gear attached to the first shaft member and a second gear attached to the end of the second shaft member and a continuous chain that is engaged with the first and second gears so that rotation of the first gear results in rotation of the second gear.

17. The travel trailer of claim 13, wherein the multilevel floor includes a main level, wherein the first level and the second level are elevated above the main level.

18. The travel trailer of claim 17, wherein the first level comprises a bathroom and a first floor of the extendable housing expands floor area of the bathroom.

19. The travel trailer of claim 18, wherein the second level comprises a bedroom having a bed positioned therein, wherein the bed is mounted so that a portion of the bed is positioned within the extendable housing so that when the extendable housing is in the second position, the portion of the bed is positioned outside of the first wall of the plurality of walls of the trailer.

20. The travel trailer of claim 13, further comprising a foldable wardrobe assembly having a width wherein the foldable wardrobe assembly is positioned within the extendable housing so that the foldable wardrobe assembly moves with the extendable housing, wherein the foldable wardrobe assembly is foldable between a first orientation that reduces the width of the foldable wardrobe assembly so as to enable the extendable housing to be moved into the retracted configuration and a second orientation that restores the width of the foldable wardrobe to the width when the extendable housing is moved into the deployed configuration.

21. The travel trailer of claim 20, wherein the foldable wardrobe comprises:

a fixed cabinet attached to the extendable housing;

a hinge attached to the fixed cabinet adjacent a first surface of a first cabinet; and a pivoting cabinet attached to the hinge at a first surface of a second cabinet so that a second cabinet can be pivoted about the hinge.

22. The travel trailer of claim 21, wherein the first surface of the pivoting cabinet is oriented so as to be substantially perpendicular to the first surface of the fixed cabinet when the foldable wardrobe assembly is placed into the first orientation, and wherein the first surface of the pivoting cabinet is oriented so as to be substantially parallel with the first surface of the fixed cabinet when the foldable wardrobe assembly is placed into the second orientation.

23. The travel trailer of claim 22, wherein the fixed cabinet of the foldable wardrobe assembly is positioned on the first level of the multilevel floor of the extendable housing.

24. A recreational travel trailer that can be towed on a road by a passenger vehicle, the recreational travel trailer comprising:

a frame;

a plurality of wheels that attach to the frame so as to support the travel trailer in a state of rest and so as to support the travel trailer in a state of relative motion with respect to the road;

a main housing having a plurality of walls that form an interior living space, wherein the main housing is coupled with the frame so as to support the main housing, wherein the main housing includes a first floor and a second floor that are vertically offset from each other, wherein the plurality of walls of the main housing further includes a first wall having a first opening; and an extendable housing having a storage configuration and a deployed configuration, wherein the extendable housing is comprised of a plurality of walls that form a supplemental living space therein, wherein the plurality of walls of the extendable housing form a first floor and a second floor, wherein the first floor and the second floor of the extendable housing are vertically offset from each other, wherein the extendable housing is positioned within the first opening of the first wall of the main housing so that the first floor of the extendable housing is positioned proximate the first floor of the main housing and so that the second floor of the extendable member is positioned proximate the second floor of the main housing, wherein the extendable housing, in the storage configuration, is positioned substantially inside the housing so as to provide the travel trailer with a shape that is suitable for being towed on a public road, and wherein the extendable housing, in the deployed configuration, is positioned substantially outside the housing so as to increase the interior living space of the travel trailer;

a movement mechanism coupled with the extendable housing so as to be able to move the extendable housing between the storage configuration and the deployed configuration, wherein the movement mechanism comprises a first member attached to a first section of the extendable housing, wherein the first member is movable between a retracted position and an extended position, a second member attached to a second section of the extendable housing, wherein the second member is movable between a retracted position and an extended position, wherein the first and second members are adapted to move between the retracted position and the extended position simultaneously at the same rate in a manner so as to maintain the extendable housing in an aligned state with respect to the main housing.

25. The travel trailer of claim 24 wherein the movement mechanism is comprised of at least one lineal actuator attached to the pop out assembly that is movable between a retracted position and an extended position.

26. The travel trailer of claim 25 wherein the movement mechanism further comprises a means for moving the linear actuator between the retracted and the extended position.

27. The travel trailer of claim 26, wherein the movement mechanism comprises:
a first rail attached to the first end of the pop out assembly, wherein the first rail is movable between a retracted and extended position;
a second rail attached a to a second end of the pop out assembly, wherein the second rail is movable between a retracted and extended position;
a motor which is coupled with the first rail so as to be able to move the first rail between the retracted and extended position;
a linkage assembly that links the first rail and the second rail so as to ensure that the first and second rails move between the retracted position and the extended position simultaneously at the same rate.

28. The travel trailer of claim 27, wherein the linkage assembly comprises;
a first shaft member mounted to the pop-out assembly so as to extend generally horizontally at a first height above the ground so as to be rotatable wherein the first shaft member is attached to the first rail so that movement of the first rail between the retracted position and the extended position results in corresponding rotation of the first shaft member;
a second shaft member mounted to the pop-out assembly so as to extend generally at a second height above the ground and so as to be rotatable wherein the second shaft member is attached to the second rail so that rotation of the second shaft member results in movement of the second rail between the retracted position and the extended position;
a vertical linkage mechanism that is coupled to the first and second shaft members so that rotational movement of the first shaft member results in corresponding rotational movement of the second shaft member.

29. The travel trailer of claim 28, wherein the vertical linkage mechanism is comprised of a first sprocket attached to the first shaft member and a second sprocket attached to the end of the second shaft member and a continuous chain that is engaged with the first and second sprocket members so that rotation of the first sprocket member results in rotation of the second sprocket member.

30. A travel trailer comprising:
a frame;
a set of wheels attached to the frame to permit rolling movement of the trailer over the ground;
a floor attached to the frame, wherein the floor defines an inner living space of the trailer and wherein the floor has a first vertical level positioned at a first height above the ground and a second vertical level positioned at a second height above the ground greater than the first vertical level wherein the first vertical level defines a bathroom of the trailer and the second vertical level defines a bedroom of the trailer;
a plurality of walls mounted on the floor so as to enclose the inner living space of the trailer; and
a pop out assembly attached to a first wall of the plurality of walls of the trailer, the pop out assembly including a floor having a first level and a second level and a plurality of walls mounted at outer edges of the floor, wherein the pop out assembly is movable between a first position such that an outer wall of the pop out assembly is positioned adjacent an outer wall of the first wall and a second position wherein the pop out assembly is extended outward from the first wall and wherein the pop out assembly is attached to the first wall so that the first level of the pop out assembly increases floor area of the bathroom of the trailer and wherein the second level of the pop out assembly increases floor area of the bedroom of the trailer when the pop out assembly is in the extended position;
a movement mechanism coupled with the pop out assembly so as to be able to move the pop out assembly between the first position and the second position, wherein the movement mechanism comprises a first member attached to a first section of the pop out assembly, wherein the first member is movable between a retracted configuration and an extended configuration, a second member attached to a second section of the pop out assembly, wherein the second member is movable between a retracted configuration and an extended configuration, wherein the first and second members are adapted to move between the retracted configuration and the extended configuration simultaneously at the same rate in a manner so as to maintain the pop out assembly in an aligned state with respect to the main housing.

31. The travel trailer of claim 30, further comprising the movement mechanism coupled with the pop out assembly so that the pop out assembly is movable between the extended configuration and the retracted configuration.

32. The travel trailer of claim 31, wherein the movement mechanism is comprised of at least one lineal actuator attached to the pop out assembly that is movable between a retracted position and an extended position.

33. The travel trailer of claim 32, wherein the movement mechanism further comprises a means for moving the linear actuator between the retracted position and the extended position.

34. The travel trailer of claim 33, further comprising a mechanism for ensuring that a first end and a second end of the pop out assembly move between the retracted position and the extended state at substantially the same rate.

35. The travel trailer of claim 34, wherein the movement mechanism comprises:
a first rail attached to the first end of the pop out assembly, wherein the first rail is movable between a retracted position and an extended position;
a second rail attached to a second end of the pop out assembly, wherein the second rail is movable between a retracted position and an extended position;
a motor which is coupled with the first rail so as to be able to move the first rail between the retracted position and the extended position; and a linkage assembly that links the first and the second rail so as to ensure that the fist and second rails move between the retracted position and the extended position simultaneously at the same rate.

36. The travel trailer of claim 30, further comprising a movable cabinet assembly that is positioned within the pop out assembly that is movable between a storage configuration and a deployed configuration.

37. The travel trailer of claim 36, wherein the movable cabinet is comprised of a foldable wardrobe assembly having a width wherein the foldable wardrobe assembly is positioned within the pop out assembly so that the foldable wardrobe assembly moves with the pop out assembly, wherein the foldable wardrobe assembly is foldable between a first orientation that reduces the width of the foldable wardrobe assembly so as to enable the pop out assembly to be moved into the retracted configuration and a second orientation that restores the width of the foldable wardrobe to the width when the extendable housing is moved into the deployed configuration.

38. The travel trailer of claim 37, wherein the foldable wardrobe comprises:

a fixed cabinet attached to the pop out assembly;

a hinge attached to the fixed cabinet adjacent a first surface of the fixed cabinet; and a pivoting cabinet attached to the hinge at a first surface of a second cabinet so that a second cabinet can be pivoted about the hinge.

39. The travel trailer of claim 38, wherein the first surface of the pivoting cabinet is orientated so as to be substantially perpendicular to the first surface of the fixed cabinet when the foldable wardrobe is placed into the first orientation, and wherein the first surface of the pivoting cabinet is oriented so as to be substantially parallel with the first surface of the fixed cabinet when the foldable wardrobe is placed into the second orientation.

* * * * *

UNITED STATES PATENT AND TRADEMARK OFFICE
CERTIFICATE OF CORRECTION

PATENT NO. : 6,447,048 B2  
DATED : September 10, 2002  
INVENTOR(S) : Johnnie Robert Crean It is certified that error appears in the above-identified patent and that said Letters Patent is hereby corrected as shown below:

Column 16,
Line 63, please delete "second level" and insert therefore, -- second vertical level --.

Signed and Sealed this

Twenty-third Day of September, 2003

JAMES E. ROGAN
*Director of the United States Patent and Trademark Office*